US012703510B1

(12) United States Patent
Binette et al.

(10) Patent No.: US 12,703,510 B1
(45) Date of Patent: Aug. 11, 2026

(54) METHOD AND APPARATUS FOR ENGINE HOT SECTION MAINTENANCE

(71) Applicant: PRATT & WHITNEY CANADA CORP., Longueuil (CA)

(72) Inventors: Hugo Binette, Inverary (CA); Sébastien Dumont, Cowansville (CA); Abdelkhalek Saadi, Lasalle (CA); Danny Noiseux, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/048,258

(22) Filed: Feb. 7, 2025

(51) Int. Cl.
*B23P 6/00* (2006.01)
*B64F 5/40* (2017.01)

(52) U.S. Cl.
CPC ...................................... *B64F 5/40* (2017.01)

(58) Field of Classification Search
CPC .. B23P 19/042; B64F 5/10; B64F 5/40; F10D 25/285; F01D 5/005
See application file for complete search history.

(56) References Cited

U.S. PATENT DOCUMENTS 5,267,397 A 12/1993 Wilcox
7,827,686 B2 11/2010 Burmeister et al.
7,861,579 B2 1/2011 Mainville
8,262,050 B2 9/2012 Linz
8,683,670 B2 4/2014 Thomas
9,038,253 B2 5/2015 Herbold et al.
9,228,451 B2 1/2016 Reinhardt et al.
9,694,482 B2 7/2017 Thomas
9,982,568 B2 5/2018 Reinhardt et al.
10,458,282 B2 10/2019 Reinhardt et al.
10,989,145 B2 4/2021 Cooper et al.
11,111,790 B2 9/2021 Cooper et al.
11,548,660 B2 1/2023 Henriksen et al.
11,572,806 B2 2/2023 Fisher et al.
11,686,221 B2 6/2023 Porco et al.
11,725,541 B2 8/2023 Müller et al.
11,753,963 B2 9/2023 Adam et al.
11,807,398 B2 11/2023 Henriksen et al.
(Continued)

FOREIGN PATENT DOCUMENTS

CN 117226498 A 12/2023
DE 102023124522 B3 12/2024
EP 3161274 B1 3/2019

*Primary Examiner* — Jun S Yoo
(74) *Attorney, Agent, or Firm* — NORTON ROSE FULBRIGHT CANADA LLP

(57) ABSTRACT

A method of servicing an aircraft engine mounted to an aircraft, the aircraft engine having a central axis and a case assembly including a first case secured to a second case and being axially offset from one another, the method includes: while the aircraft engine remains mounted to the aircraft: radially supporting, relative to the central axis, an end of a shaft of the aircraft engine through a central passage extending axially through the first case; creating a gap between the first case and the second case by axially moving the first case away from the second case and relative to the shaft while preventing axial and radial movements of the shaft relative to the central axis; radially and axially supporting the shaft at the gap; and removing the first case by disconnecting the end of the shaft while maintaining the shaft radially and axially supported at the gap.

20 Claims, 16 Drawing Sheets

(56) References Cited

U.S. PATENT DOCUMENTS

| | | | | |
|---|---|---|---|---|
| 12,000,302 | B2 | 6/2024 | Porco et al. | |
| 2014/0252160 | A1 | 9/2014 | Suciu et al. | |
| 2021/0324764 | A1* | 10/2021 | Müller | F01D 25/285 |
| 2022/0048647 | A1* | 2/2022 | Henriksen | B64F 5/10 |
| 2023/0167753 | A1* | 6/2023 | Porco | B64F 5/50 29/889.1 |

* cited by examiner

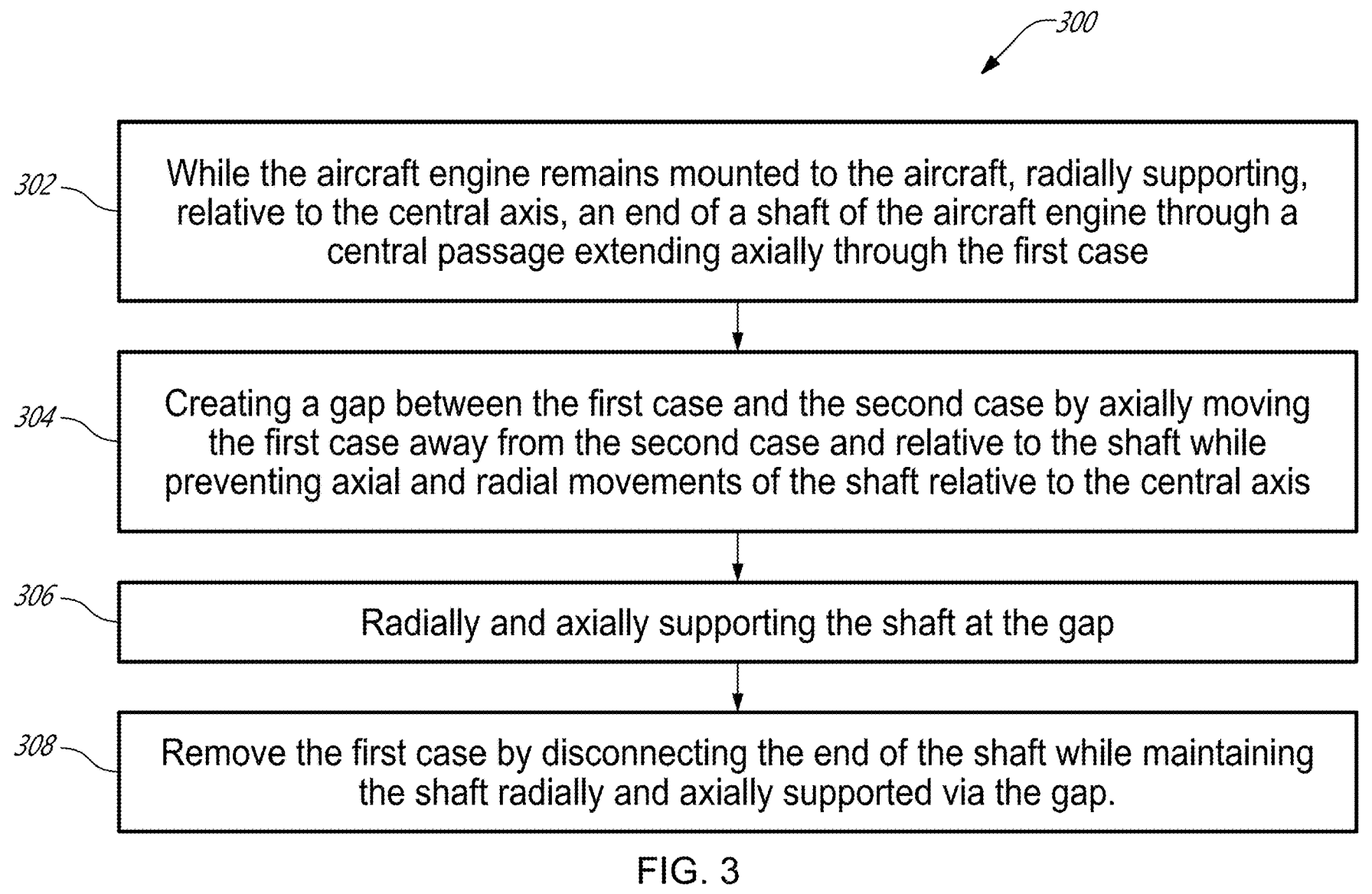

300

302 — While the aircraft engine remains mounted to the aircraft, radially supporting, relative to the central axis, an end of a shaft of the aircraft engine through a central passage extending axially through the first case 304 — Creating a gap between the first case and the second case by axially moving the first case away from the second case and relative to the shaft while preventing axial and radial movements of the shaft relative to the central axis 306 — Radially and axially supporting the shaft at the gap 308 — Remove the first case by disconnecting the end of the shaft while maintaining the shaft radially and axially supported via the gap.

FIG. 3

METHOD AND APPARATUS FOR ENGINE HOT SECTION MAINTENANCE

TECHNICAL FIELD

The application relates generally to aircraft engines and, more particularly, to apparatuses and methods used for supporting aircraft engines during repair and/or maintenance operations.

BACKGROUND

Aircraft engines have hot sections including turbine sections that receive combustion gases. Overtime, these sections need servicing, which may include inspection, replacement, maintenance and so on. Typically, the engine in need of servicing is removed from the aircraft. Although this process is satisfactory to some extend, there remains a need for improvement.

SUMMARY

In one aspect, there is provided a method of servicing an aircraft engine mounted to an aircraft, the aircraft engine having a central axis and a case assembly including a first case secured to a second case and being axially offset from one another, the method comprising: while the aircraft engine remains mounted to the aircraft: radially supporting, relative to the central axis, an end of a shaft of the aircraft engine through a central passage extending axially through the first case; creating a gap between the first case and the second case by axially moving the first case away from the second case and relative to the shaft while preventing axial and radial movements of the shaft relative to the central axis; radially and axially supporting the shaft at the gap; and removing the first case by disconnecting the end of the shaft while maintaining the shaft radially and axially supported at the gap.

The method described above may include any of the following features, in any combinations.

In some embodiments, the radially supporting of the end of the shaft includes: inserting a shaft supporting rod through a central passage defined by the first case; and locking the shaft supporting rod to the shaft.

In some embodiments, the method includes detachably mounting the shaft supporting rod to a support fixture assembly mounted to the case assembly of the aircraft engine.

In some embodiments, the method includes: mounting a static member of the support fixture assembly to a case of the case assembly, the case being distinct from the first case; mounting a mobile member of the support fixture assembly to the first case, the mobile member slidably engaged to the static member of the support fixture assembly.

In some embodiments, the inserting of the shaft supporting rod includes: securing a brace fixture of the support fixture assembly to the static member of the support case assembly; and securing the shaft supporting rod to the static member of the support case assembly via the brace fixture.

In some embodiments, the creating of the gap includes: axially locking the shaft supporting rod to the static member of the support fixture assembly; exerting a pushing force on the shaft supporting rod with an actuator, the pushing force being counteracted by a pulling force exerted on the first case.

In some embodiments, the actuator has an outer member being slidable relative to an inner member, the inner member defining a central bore for slidably receiving the shaft supporting rod, the exerting of the pushing force on the shaft including: inserting the shaft supporting rod through the central bore of the inner member of the actuator; axially locking the outer member of the actuator to the first case; and exerting the pushing force on a stopper defined by the shaft supporting rod thereby exerting the pulling force on the first case.

In some embodiments, the axially locking of the outer member of the actuator to the first case includes: securing the outer member of the actuator to a pad; securing an adaptor to an inter-shaft of the first case, the inter-shaft rotatably mounted to the first case and drivingly engaged to the shaft; and securing a spacer to both of the pad and the adaptor.

In some embodiments, the axially moving of the first case away from the second case and relative to the shaft includes: sliding the mobile member and the first case mounted thereto relative to the static member to separate the first case from the second case thereby creating the gap.

In some embodiments, the radially and axially supporting of the shaft through the gap includes: mounting an intermediate shaft support to the static member of the support fixture assembly; and connecting the intermediate shaft support to the shaft.

In some embodiments, the removing of the first case includes: separating the mobile member of the support fixture assembly from the static member; and moving the first case away from the second case via the mobile member.

In some embodiments, the moving of the first case includes hoisting the first case via the mobile member.

In some embodiments, the mounting of the static member of the support fixture assembly to the second case includes mounting the static member of the support fixture assembly to a flange of the second case.

In some embodiments, the static member of the support fixture assembly has a top beam and a brace secured to the top beam, the brace defining a U-shape and extending partially around the case assembly, the method including: securing the brace to the flange of the second case.

In some embodiments, the mobile member of the support fixture assembly has a top rail, the method including: slidably engaging the top rail of the mobile member to the top beam of the static member.

In some embodiments, the mobile member includes a forward brace and a rearward brace both secured to the top rail, the method including: securing each of opposite flanges of the first case to a respective one of the forward brace and the rearward brace.

In some embodiments, the method includes, after the removing of the first case, removing a high-pressure turbine being enclosed by the second case.

In some embodiments, the removing of the high-pressure turbine includes: unfastening a nut threadingly engaged to a high-pressure shaft of the aircraft engine; and pulling on the high-pressure turbine.

In some embodiments, the pulling on the high-pressure turbine includes pulling on the high-pressure turbine with an actuator.

In some embodiments, the method includes, after servicing of the aircraft engine re-installing the first case by: slidably engaging the mobile member to the static member; radially and axially supporting the end of the shaft with the static member; disengaging the shaft from the static member via the gap; and moving the first case towards the second case.

BRIEF DESCRIPTION OF THE DRAWINGS

Reference is now made to the accompanying figures in which:

FIG. 3 is a flowchart illustrating steps of a method of servicing an aircraft engine mounted to an aircraft;

DETAILED DESCRIPTION

Figure 1:
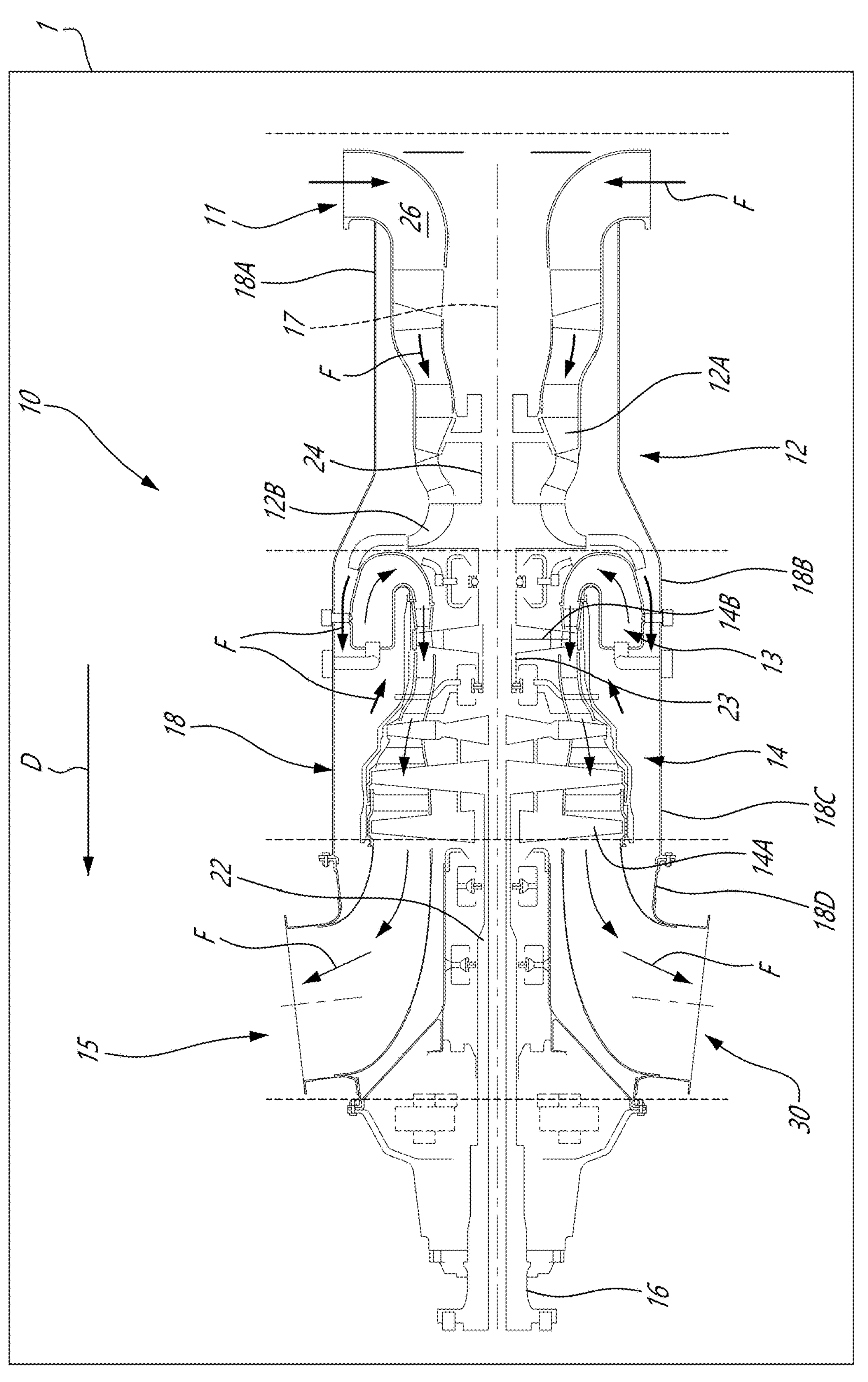
FIG. 1 is a schematic cross-sectional view of an aircraft engine depicted as a turboprop gas turbine engine.

FIG. 1 illustrates an aircraft engine depicted as a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the gas turbine engine 10. The gas turbine engine 10 has a central axis 17. The gas turbine engine 10 in FIG. 1 is a turboprop engine and includes an output shaft 16, which may drive a propulsor, such as a rotor or propeller, for providing thrust for flight and taxiing. It is understood that the gas turbine engine 10 can adopt various other configurations. For instance, the gas turbine engine could be configured as a turboshaft engine having an output shaft connectable to a rotatable load, such as a helicopter rotor or the like. The gas turbine engine 10 is shown as being part of an aircraft 1.

The gas turbine engine 10 has an outer case assembly 18 housing a core through which gases flow and which includes most of the turbomachinery of the gas turbine engine 10. The illustrated gas turbine engine 10 is a "reverse-flow" engine 10 because gases flow through the core from the air inlet 11 at a rear or aft portion of the gas turbine engine 10, to the exhaust system 15 at a front portion of the gas turbine engine 10. This is in contrast to "through-flow" gas turbine engines in which gases flow through the core of the gas turbine engine from a front portion to a rear portion. The direction of the flow of gases through the gas turbine engine 10 is shown in FIG. 1 with arrows F.

It will thus be appreciated that the expressions "forward" and "aft" used herein may refer to the relative disposition of components of the gas turbine engine 10, in correspondence to the "forward" and "aft" directions of the gas turbine engine 10 and aircraft including the gas turbine engine 10 as defined with respect to the direction of travel D. In the embodiment shown, a component of the gas turbine engine 10 that is "forward" of another component is arranged within the gas turbine engine 10 such that it is located closer to the output shaft 16. Similarly, a component of the gas turbine engine 10 that is "aft" of another component is arranged within the gas turbine engine 10 such that it is further away from the output shaft 16.

Still referring to FIG. 1, the core of the gas turbine engine 10 may include one or more spools. The illustrated embodiment is a two-spool engine including a low pressure (LP) spool and a high pressure (HP) rotatable about the central axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14A which extracts energy from the combustion gases, and an LP compressor 12A for pressurizing the air. The LP turbine 14A and the LP compressor 12A can each include one or more stages of rotors and stators, depending upon the desired engine thermodynamic cycle, for example. The LP spool further comprises an LP shaft 22 drivingly connecting the LP turbine 14A to the LP compressor 12A. Gears (not shown) can be provided to allow the LP compressor 12A to rotate at a different speed than the LP turbine 14A. The LP turbine 14A may also drivingly connected to the output shaft 16 via a RGB.

Still referring to FIG. 1, the HP spool comprises an HP turbine 14B drivingly engaged (e.g. directly connected) to a HP compressor 12B by a high pressure shaft 24. Similarly to the LP turbine 14A and the LP compressor 12A, the HP turbine 14B and the HP compressor 12B can each include one or more stages of rotors and stators. The LP compressor 12A, the HP compressor 12B, the combustor 13, the HP turbine 14B and the LP turbine 14A are in serial flow communication via a gas path 26 being annular and extending through the core about the central axis 17. The gas path 26 leads to the exhaust system 15 downstream of the turbine section 14.

The outer case assembly 18 includes a plurality of cases disposed along the central axis 17 of the gas turbine engine 10. These cases are secured to one another at mating flanges using suitable fastening means, such as nuts and bolts. Any fastening means are contemplated. The outer case assembly 18 includes a compressor case 18A enclosing the compressor section 12, a combustor case 18B enclosing the combustor 13, a turbine case 18C enclosing the turbine section 14, and an exhaust case 18D being part of the exhaust system 15.

In some cases, it is desirable to service the hot section of the gas turbine engine 10. The hot section includes, for instance, parts of the turbine section 14 and of the combustor 13, and is also sometimes referred to as a gas generator case. Typically, the gas turbine engine 10 is removed from the aircraft 1 equipped with said engine to be serviced. In the meantime, a leased engine is installed on the aircraft or the aircraft is grounded. This may cause significant costs, delays, and so on.

In the following lines, an on-wing maintenance system for performing maintenance of the aircraft engine, such as the gas turbine engine 10, when still mounted to the aircraft 1 is described. Then, a method of performing maintenance of the gas turbine engine 10 using the system is described. The hot section of the gas turbine engine 10 is challenging to repair/inspect since one of the shaft of the engine, such as the LP shaft 22, may be free to move axially relative to the central axis 17 of the gas turbine engine 10. Hence, while removing some components of the engine, care should be taken to axially and radially support the shaft to prevent its movement, which may damage adjacent components.

Figure 2A:
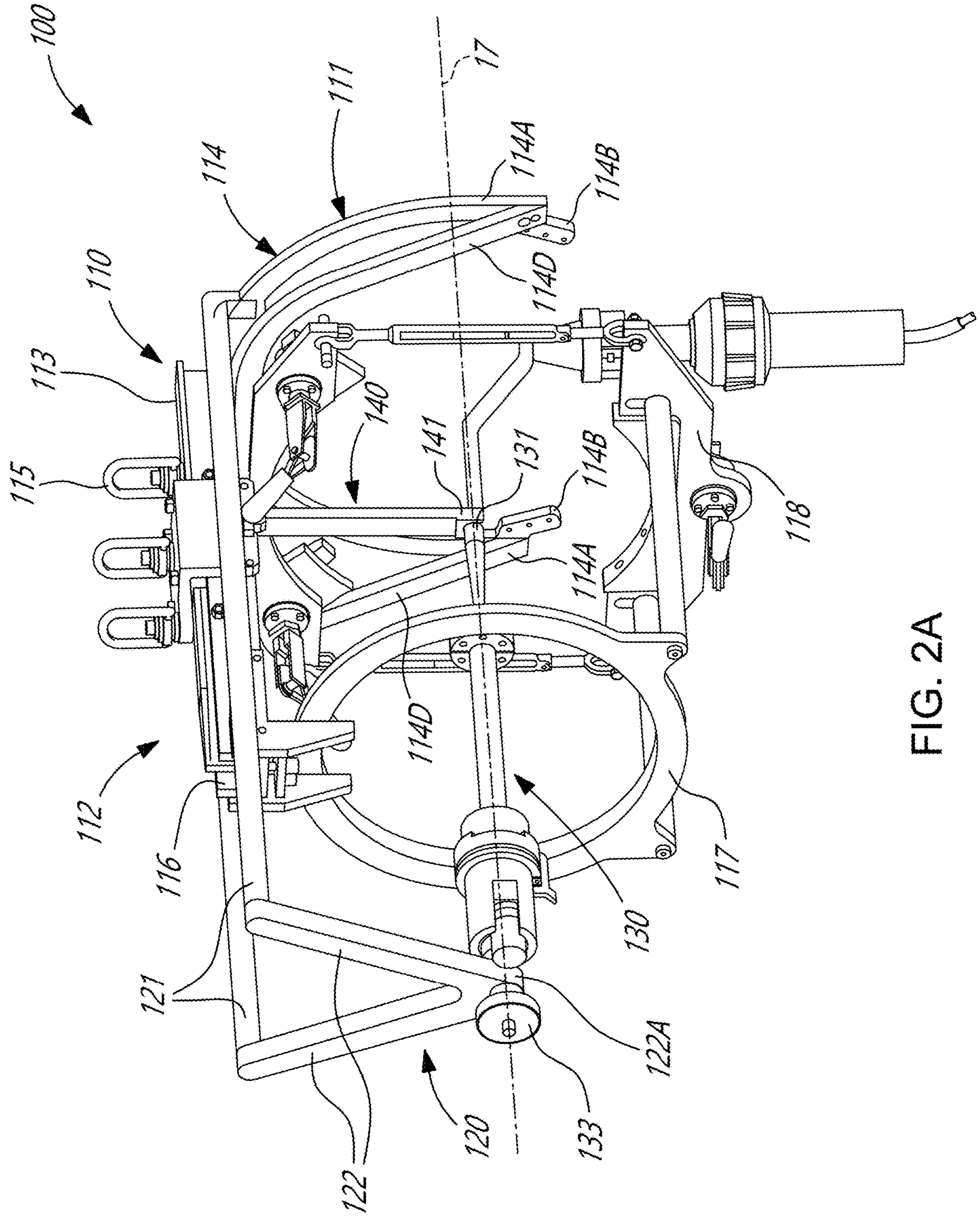
FIG. 2A is a three dimensional view of an on-wing maintenance system.

Referring now to FIG. 2A, the on-wing maintenance system is shown at 100 and referred to below simply as "system". The system 100 is used to separate a case of the case assembly 18 of the gas turbine engine 10 from a remainder of the case assembly 18 for accessing components enclosed by these cases while the engine remains mounted on the aircraft 1, whether it be at a nose, on a wing, or on a fuselage, of the aircraft 1. The system 100 may radially and axially support the LP shaft 22 during the maintenance of the gas turbine engine 10 as will be described below. By "supporting", it is implied that the system 100 may be configured to block radial and axial movements of the LP shaft 22 during the maintenance. This may be used to prevent movements of the LP shaft 22 during the maintenance to avoid said shaft to pull or push or other components (e.g., rotors) to avoid inducing damage to those components.

The below description focuses on the removal of the exhaust case 18D from the turbine case 18C to access components of the turbine section 14. It will however be appreciated that the system and method described herein may be used for any cases of the aircraft engine without departing from the scope of the present disclosure.

The system 100 includes a support fixture assembly 110 having a static member 111 removably securable to a first case of the case assembly 18 and a mobile member 112 removably securable to a second case of the case assembly 18. The first and second cases may be immediately adjacent to one another or may be separated from one another via an intermediate case. The static member 111 and the mobile member 112 are herein slidably engaged to one another. The static member 111 and the mobile member 112 are axially movable one relative to the other relative to the central axis 17 of the gas turbine engine 10. A brace fixture 120 is secured to the static member 111. Herein, the brace fixture 120 is detachable from the static member 111, but this need not be the case in all configurations. The brace fixture 120 is configured to support a shaft supporting rod 130, which is itself engageable to the LP shaft 22 as will be described below. The shaft supporting rod 130 is removably securable to the brace fixture 120 and is centered relative to the case assembly 18. The system 100 further has an intermediate support member 140 removably secured to the static member 111 and extending transversally therefrom. The intermediate support member 140 is configured to radially and axially support the shaft during removal of one of the case of the case assembly 18 as will be discussed below.

The different components of the system 100 having been generally described, each of them are now described in greater detail below.

Still referring to FIG. 2A, in the embodiment shown, the static member 111 of the support fixture assembly 110 includes a top beam 113 and a brace 114 secured to the top beam 113. The brace 114 has a U-shape defined by two arms 114A extending from the top beam 113 and away from one another. The arms 114A are configured to extend at least partially around the case assembly 18. The brace 114 is securable to a flange 18G (FIG. 4) of the turbine case 18C. In some embodiments, as described above, this may be done by fastening the two connectors ends 114B of the two arms 114A to the flange 18G. Secondary arms 114D may be used to increase a stiffness of the static member 111. The secondary arms 114D both extend from the top beam 113, but from a location offset from the arms 114A. Ends of the secondary arms 114D is secured to the arms 114A proximate their respective connectors end 114B. These secondary arms 114D may be omitted in some embodiments. An anchor 115 may be secured to the top beam 113 and is configured for hoisting the static member 111 to position it at its required location. The anchor 115 may be engaged by a crane or other lifting apparatus.

The mobile member 112 has a top rail 116 slidably engaged to the top beam 113. For instance, the top rail 116 and the top beam 113 may have complimentary shapes, such as a square cross-section received into a U-shaped groove to provide for a telescopic engagement between the mobile member 112 and the top beam 113. Bearings or other rolling means may be disposed between the top rail 116 and the top beam 113 to facilitate a sliding movement relative to these components. The mobile member 112 includes a forward brace 117 and a rearward brace 118 both secured to the top rail 116. The forward brace 117 and the rearward brace 118 are both securable to the same case of the case assembly 18 of the gas turbine engine 10. The braces extend around the central axis 17. Herein, they extend a full circumference, but this need not be the case. The braces may be secured each to one of opposite flanges of the case. Only one or more than two braces may be used in some embodiments.

The brace fixture 120 includes one or more longitudinal member, two longitudinal members 121 in this embodiment, secured to the static member 111 and one or more transversal member, two transversal members 122 in this embodiment, each protruding transversally from a respective one of the longitudinal members 121. The two longitudinal members 121 extend parallel to the central axis 17. The two transversal members 122 extend along a radial direction relative to the central axis 17 and merge together at a common end 122A being coaxial with the central axis 17. In other words, the common end 122A is intersected by the central axis 17.

Figure 2B:
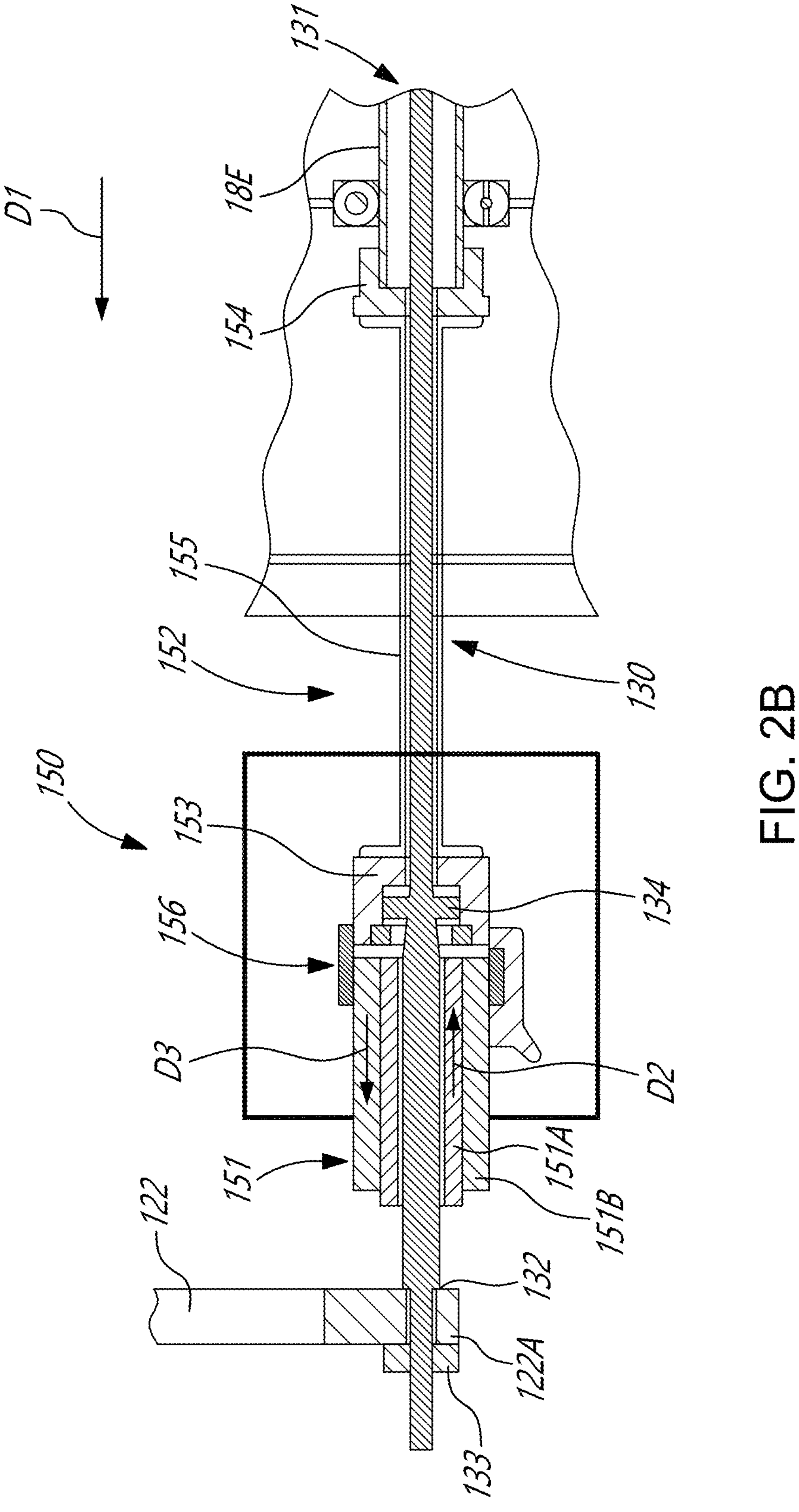
FIG. 2B is a cutaway view of components of the system of FIG. 2A.

Referring to FIGS. 2A-2B, the shaft supporting rod 130 has a shaft-engageable end 131 removably securable to an end of the LP shaft 22. For instance, the shaft-engageable end 131 may be threadingly engaged to the end of the LP shaft 22. Other configurations are contemplated. For instance, a bayonet connection may be used. As depicted in FIG. 2B, the shaft supporting rod 130 extends through the remote end 122A of the transversal members 122. The remote end 122A may define a bore sized to receive the end of the shaft supporting rod 130. A first shoulder 132 may be defined by the shaft supporting rod 130. A nut 133 may be threadingly engaged to an end of the shaft supporting rod 130 and the remote end 122A of the transversal members 122 may be sandwiched between the nut 133 and the first shoulder 132. The shaft supporting rod 130 further defines a stopper 134 whose function is described below.

Referring back to FIG. 2A, the intermediate support member 140 protrudes transversally in a radial direction from the top beam 113 of the static member 111 and terminates at a remote end 141 engageable to the LP shaft 22. In the embodiment shown, the remote end 141 defines a U-shaped notch sized to receive the LP shaft 22. The intermediate support member 140 radially and axially supports the LP shaft 22 while the shaft supporting rod 130 may be disengaged as will be explained further below.

Referring to FIG. 2B, in some embodiments, substantial force may be needed to separate the two engine cases. Thus, a case pulling mechanism 150 may be used. In some embodiments, the case pulling mechanism 150 includes an actuator 151 (e.g., hydraulic actuator) having an inner member 151A and an outer member 151B movable relative to the inner member 151A; and a connector assembly 152 for securing the outer member 151B of the actuator 151 to a component of the case to be pulled. In this case, the component is an inter-shaft 18E rollingly engaged to the exhaust case 18D, but it may be any other component. The inter-shaft 18E is drivingly engaged to the LP shaft 22, such as via a spline connection.

In the embodiment shown, the inner member 151A defines a central bore and the shaft supporting rod 130 is slidably received into the central bore. The outer member 151B of the actuator 151 is engaged to the component of the case to be pulled. Put differently, the outer member 151B is axially locked to the component via the connector assembly 152, which may include a pad 153 securable to the outer member 151B of the actuator 151, an adaptor 154 securable to the component of the case, and a spacer 155 interconnecting the pad 153 to the adaptor 154. The pad 153 may be engaged to the outer member 151B of the actuator 151 via a bayonet connector 156. The bayonet connector 156 is removably secured to the outer member 151B and the pad 153 is engaged to the outer member 151B via the bayonet connector 156. In this embodiment, the pad 153 defines tabs that are received within slots defined by the bayonet connector 156. Understandably, other connection means may be used, such as a threaded connection. The spacer 155 includes two halves conjointly extending around the shaft supporting rod 130. This allows the installation of the spacer 155 while the shaft supporting rod 130 remains engaged to both of the LP shaft 22 and the remote end 122A of the brace fixture 120. Fasteners or other means may be used to axially secure the spacer 155 to the pad 153 and to the adaptor 154. The adaptor 154 may itself be threaded to the inter-shaft 18E. Other securing means are contemplated.

For pulling on the case along a pulling direction D1, the actuator 151 is powered to move the outer member 151B relative to the inner member 151A of the actuator 151. More specifically, the powering of the actuator 151 causes the inner member 151A to move towards the case along direction D2 until it abuts the stopper 134 of the shaft supporting rod 130. This triggers a reaction force by which the outer member 151B moves towards direction D3 away from the case thereby pulling on the case via the bayonet connector 156, the pad 153, the spacer 155, and the adaptor 154. This is render possible without requiring fixing the actuator 151 on the shaft supporting rod 130. In other words, the inner member 151A of the actuator 151 is axially movable relative to the shaft supporting rod 130.

Referring now to FIG. 3, a method 300 for servicing an aircraft engine mounted to an aircraft is shown at 300. The method 300 is performed while the aircraft engine remains mounted to the aircraft 1 (FIG. 1). Put differently, the aircraft engine remains mounted to a nose, a wing, a fuselage, and so on of the aircraft during the servicing using the method 300.

The method 300 includes radially supporting an end of the LP shaft 22 through the central passage 18F extending axially through the exhaust case 18D at 302; creating a gap G (FIG. 9) between the exhaust case 18D and the turbine case 18C axially moving the exhaust case 18D away from the turbine case 18C and relative to the LP shaft 22 while preventing axial and radial movements of the LP shaft 22 relative to a central axis of the LP shaft 22 at 304; radially and axially supporting the LP shaft 22 at the gap G at 306; and removing the exhaust case 18D by disconnecting the end of the LP shaft 22 while maintaining the LP shaft 22 radially and axially supported at the gap at 308.

Reference is now made to FIGS. 4-13 to explain each steps in greater detail.

Figure 4:
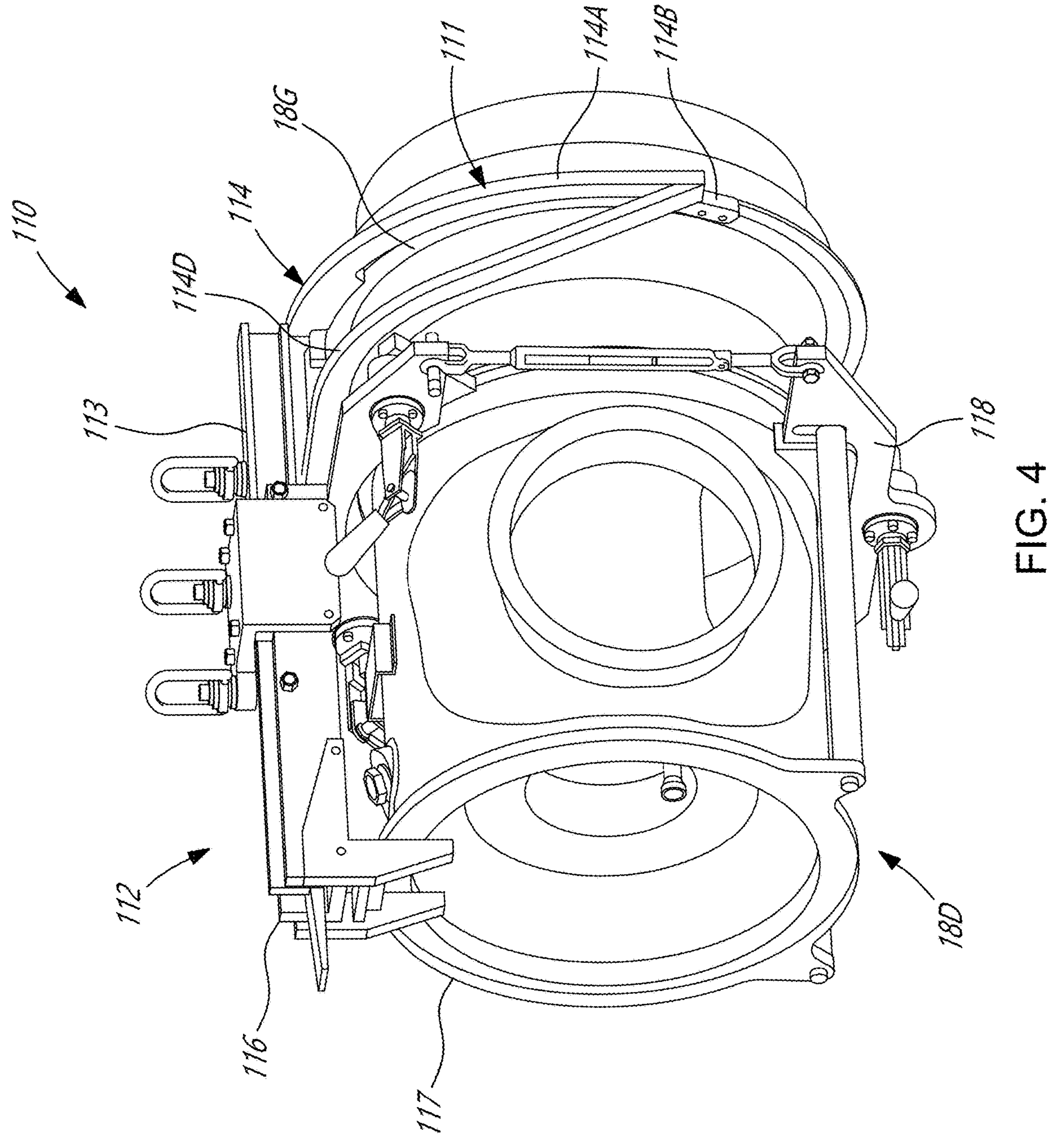
FIG. 4 is a three dimensional view illustrating a portion of a case assembly of the aircraft engine and of a support fixture assembly of the system of FIG. 2A mounted to the case assembly.

In some embodiments, and with reference to FIG. 4, the method 300 includes mounting the static member 111 of the support fixture assembly 110 to the turbine case 18C. More specifically, the static member 111 is mounted to the flange 18G of the turbine case 18C via the two connectors ends 114B. At which point, the top rail 116 of the mobile member 112 may be slidably engaged to the top beam 113 of the static member 111. Then, the forward brace 117 and the rearward brace 118 of the mobile member 112 may be secured to opposite flanges of the exhaust case 18D.

Figure 5:
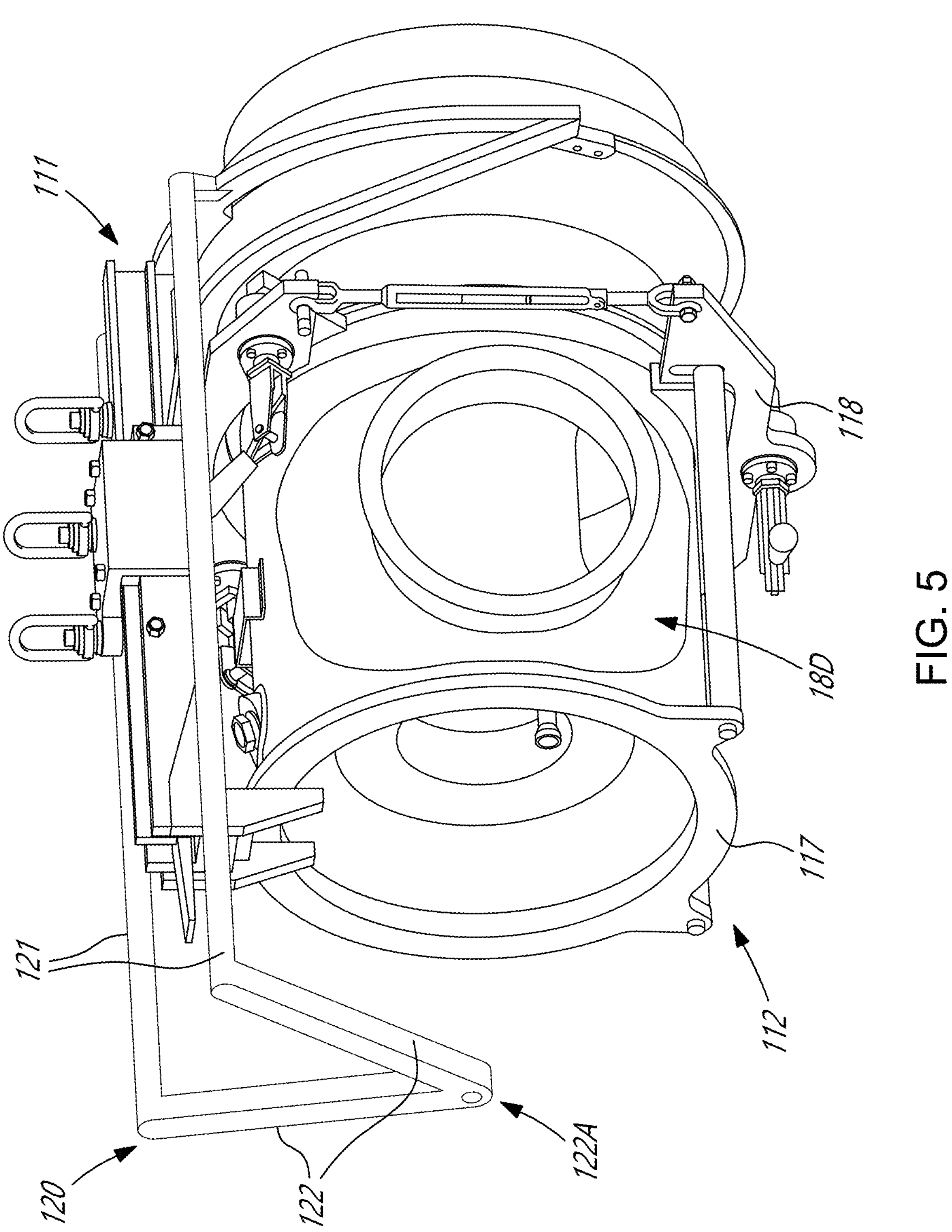
FIG. 5 is another three dimensional view of the aircraft engine and a brace fixture of the system fixture assembly.
Figure 6:
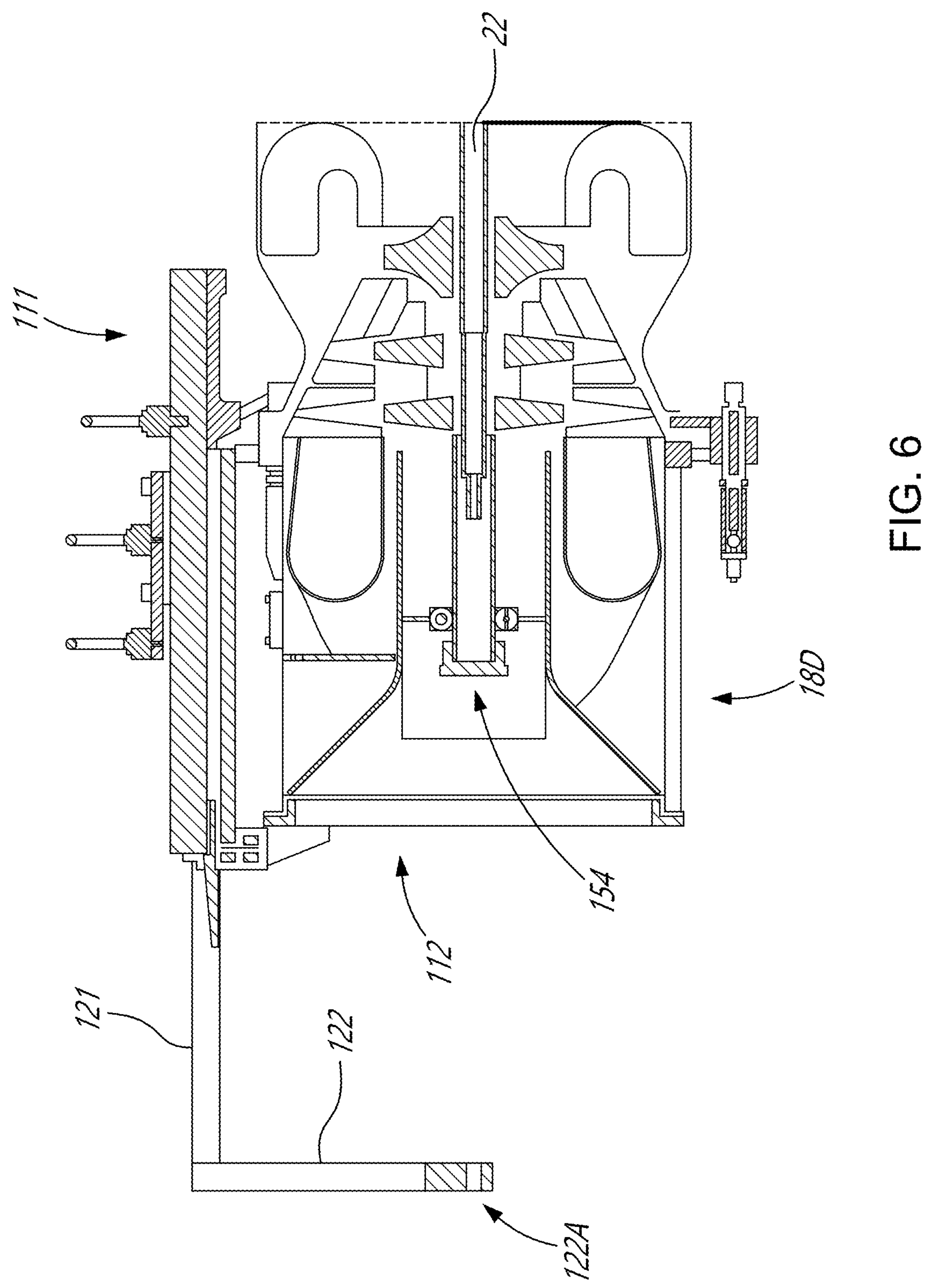
FIG. 6 is a cutaway view of the case assembly and support fixture assembly of FIG. 5.
Figure 7:
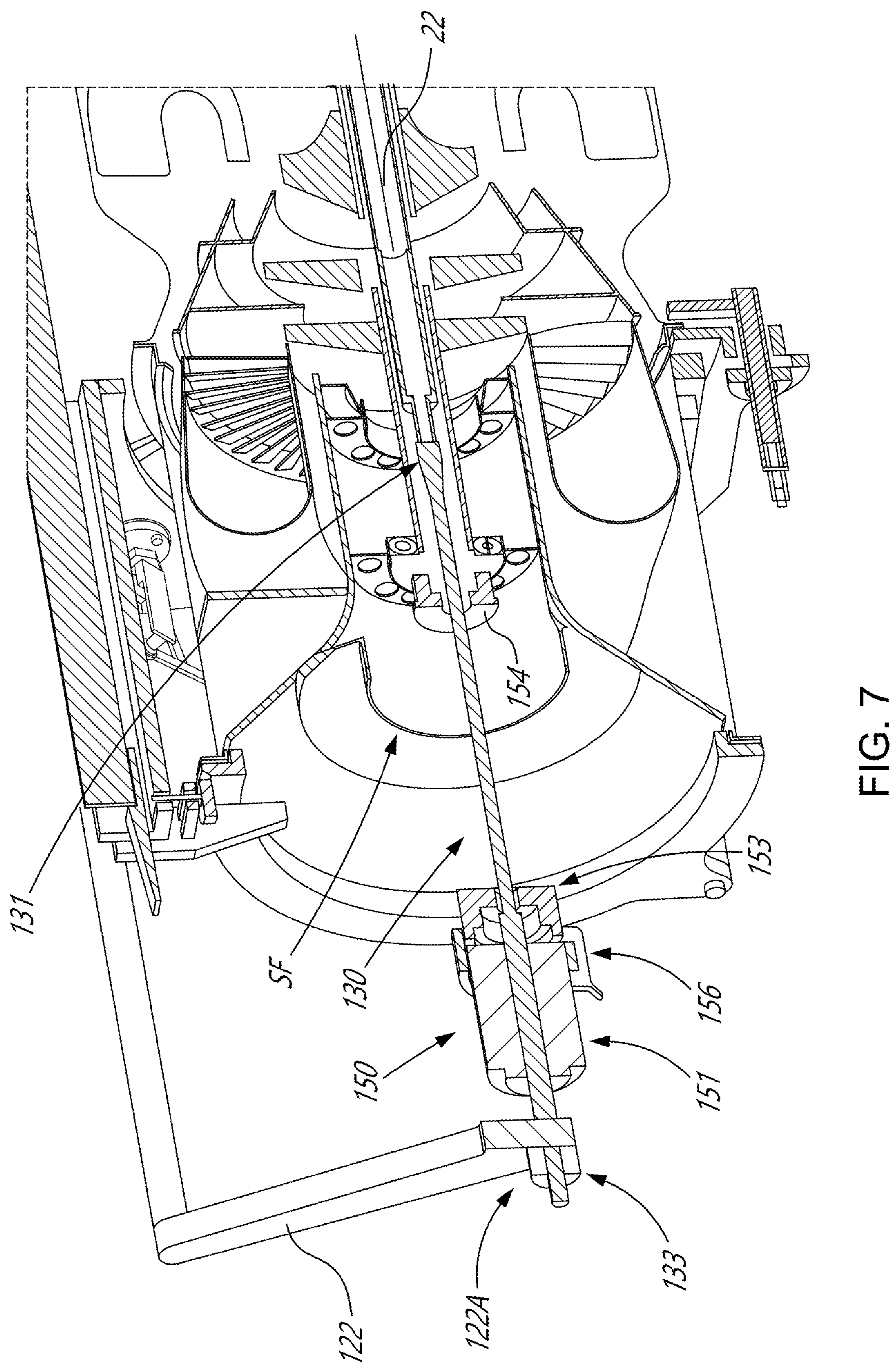
FIG. 7 is a three dimensional cutaway view of the case assembly and support fixture assembly with a shaft supporting rod mounted thereto.

In some embodiments, and referring to FIGS. 5-7, the radially supporting of the end of the LP shaft 22 at 302 includes: inserting the shaft supporting rod 130 through a central passage 18F (FIG. 7) defined by the exhaust case 18D; and locking the shaft supporting rod 130 to the LP shaft 22. To do so, the shaft supporting rod 130 may be detachably mounted to the support fixture assembly 110, which is itself mounted to the case assembly 18 of the gas turbine engine 10.

More specifically, the static member 111 of the support fixture assembly 110 is mounted to the turbine case 18C or other case of the case assembly 18. This case is distinct than the case that needs removal. Then, the mobile member 112 of the support fixture assembly 110 may be secured to the exhaust case 18D. At which point, the inserting of the shaft supporting rod 130 includes: securing the brace fixture 120 of the support fixture assembly 110 to the static member 111 of the support fixture assembly 110; and securing the shaft supporting rod 130 to the static member 111 of the support fixture assembly 110 via the brace fixture 120.

Figure 8:
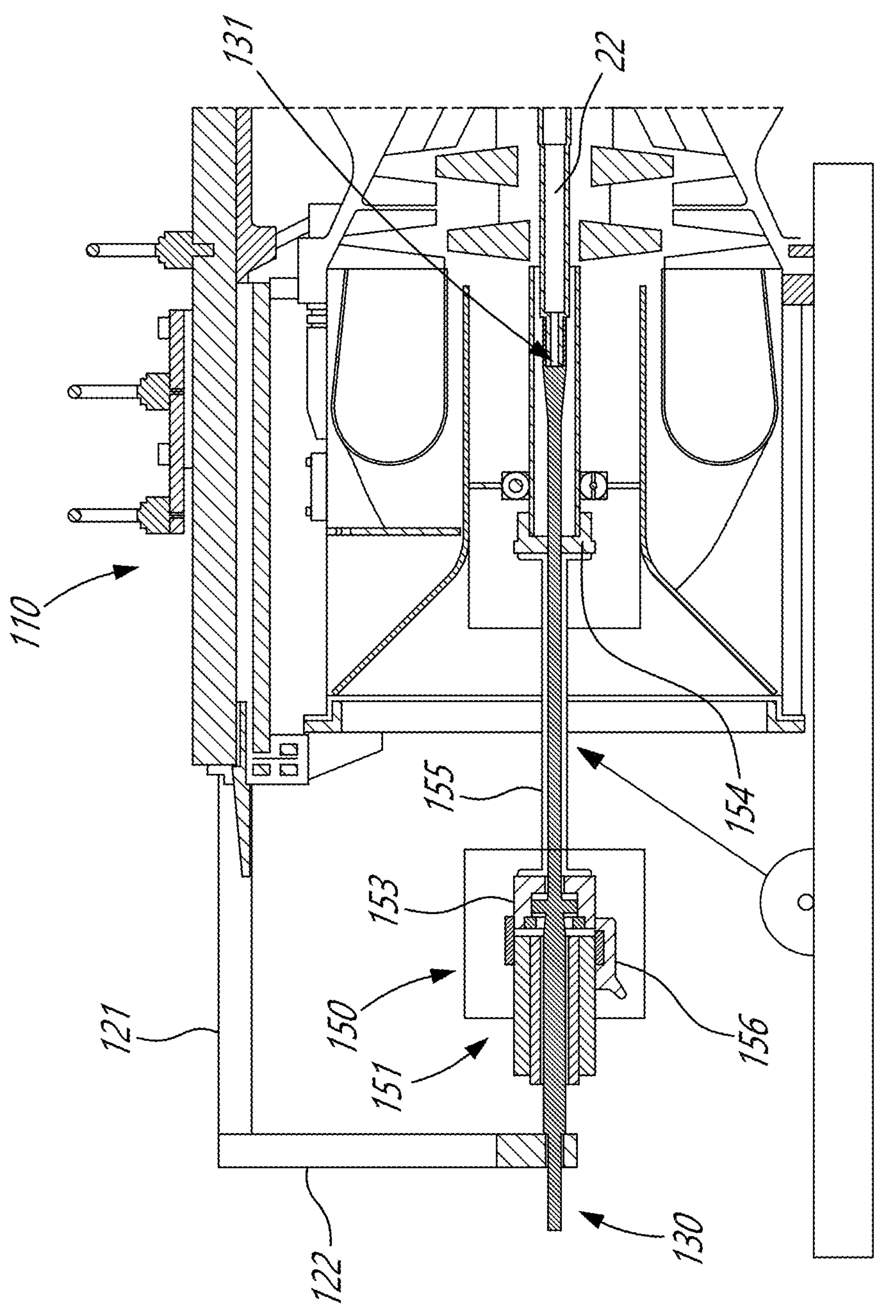
FIG. 8 is a cutaway view of the case assembly and support fixture assembly with the shaft supporting rod mounted thereto.

As shown in FIGS. 2B and 8, the separating of the exhaust case 18D from the turbine case 18C includes: axially locking the shaft supporting rod 130 to the static member 111 of the support fixture assembly 110; exerting the pushing force on the shaft supporting rod 130 with the actuator 151 while counteracting this pushing force by a pulling force exerted on the exhaust case 18D. The exerting of the pushing force on the LP shaft 22 may include: inserting the shaft supporting rod 130 through the central bore of the inner member 151A of the actuator 151; axially locking the outer member 151B of the actuator 151 to the exhaust case 18D; and exerting the pushing force on the stopper 134 defined by the shaft supporting rod 130 thereby exerting the pulling force on the exhaust case 18D. The axially locking of the outer member 151B of the actuator 151 to the exhaust case 18D may include: securing the outer member 151B of the actuator 151 to the pad 153; securing the adaptor 154 to the inter-shaft 18E of the exhaust case 18D; and securing the spacer 155 to both of the pad 153 and the adaptor 154. The movement caused by the actuator 151 may be quite small and used merely to disengaged the two cases together. Once they are disengaged, the actuator 151 may not be needed to slide the exhaust case 18D away from the turbine case 18C.

Figure 9:
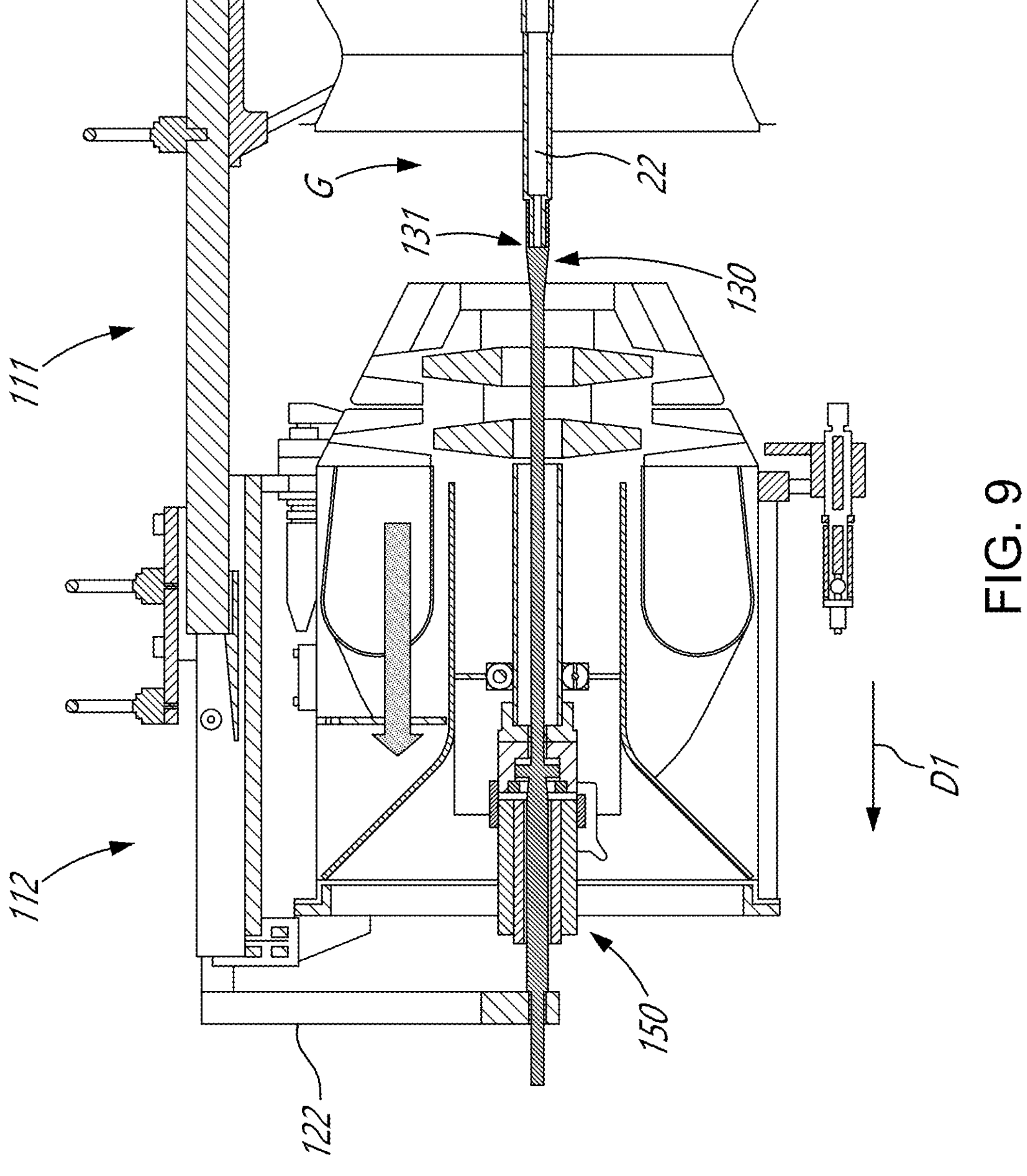
FIG. 9 is a cutaway view illustrating a movement of an exhaust case of the case assembly along the shaft supporting rod.

As depicted in FIG. 9, the axially moving of the exhaust case 18D away from the turbine case 18C and relative to the LP shaft 22 at 304 includes: sliding the mobile member 112 and the exhaust case 18D mounted thereto relative to the static member 111 to separate the exhaust case 18D from the turbine case 18C thereby creating the gap G. The spacer 155 may be removed before this step to create enough space for the exhaust case 18D to move relative to the shaft supporting rod 130.

Figure 10:
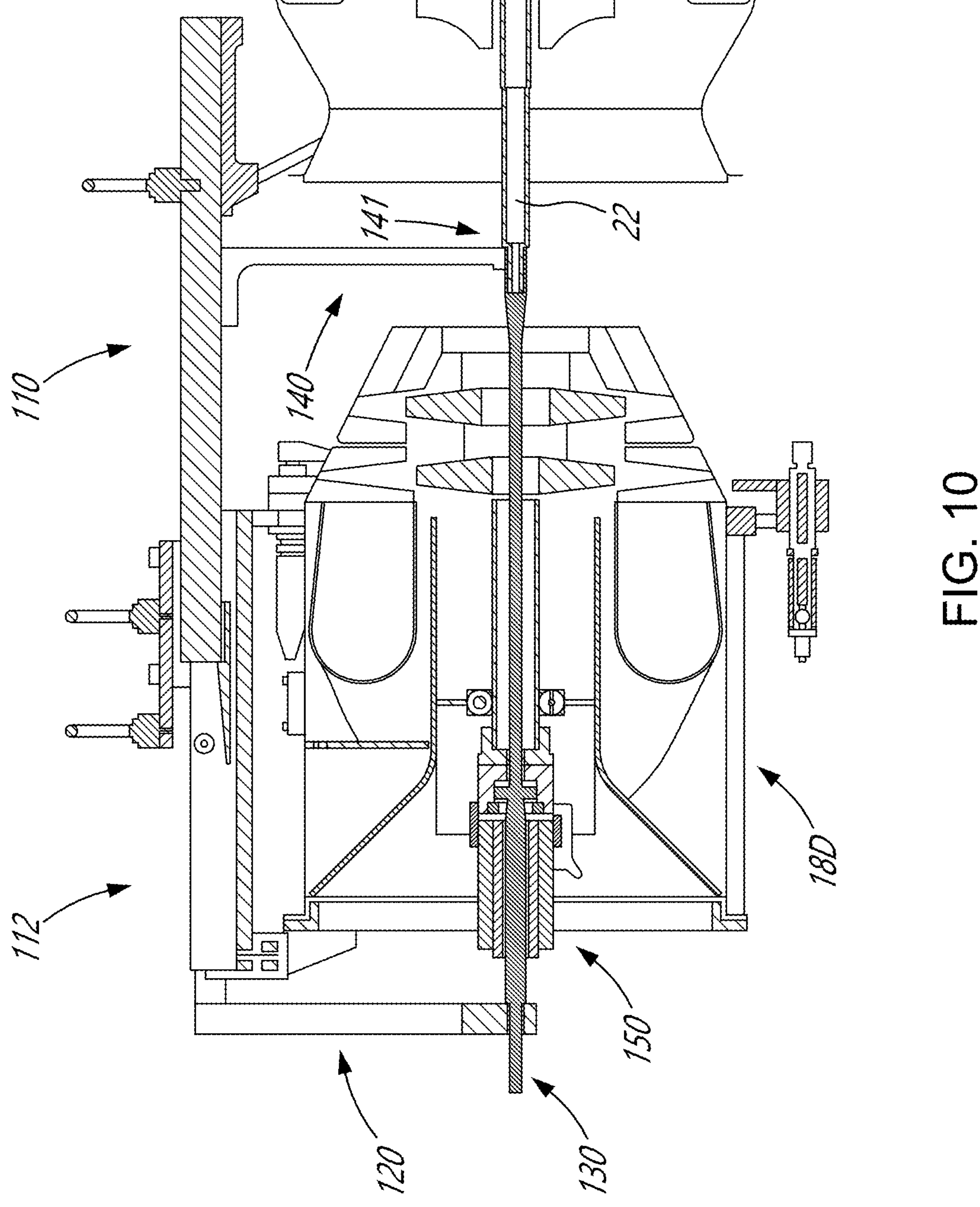
FIG. 10 is a cutaway view illustrating an intermediate shaft support secured to a shaft of the aircraft engine.

As shown in FIG. 10, the radially and axially supporting of the LP shaft 22 through the gap G at 306 includes: mounting the intermediate support member 140 to the static member 111 of the support fixture assembly 110; and connecting the intermediate support member 140 to the LP shaft 22.

Figure 11:
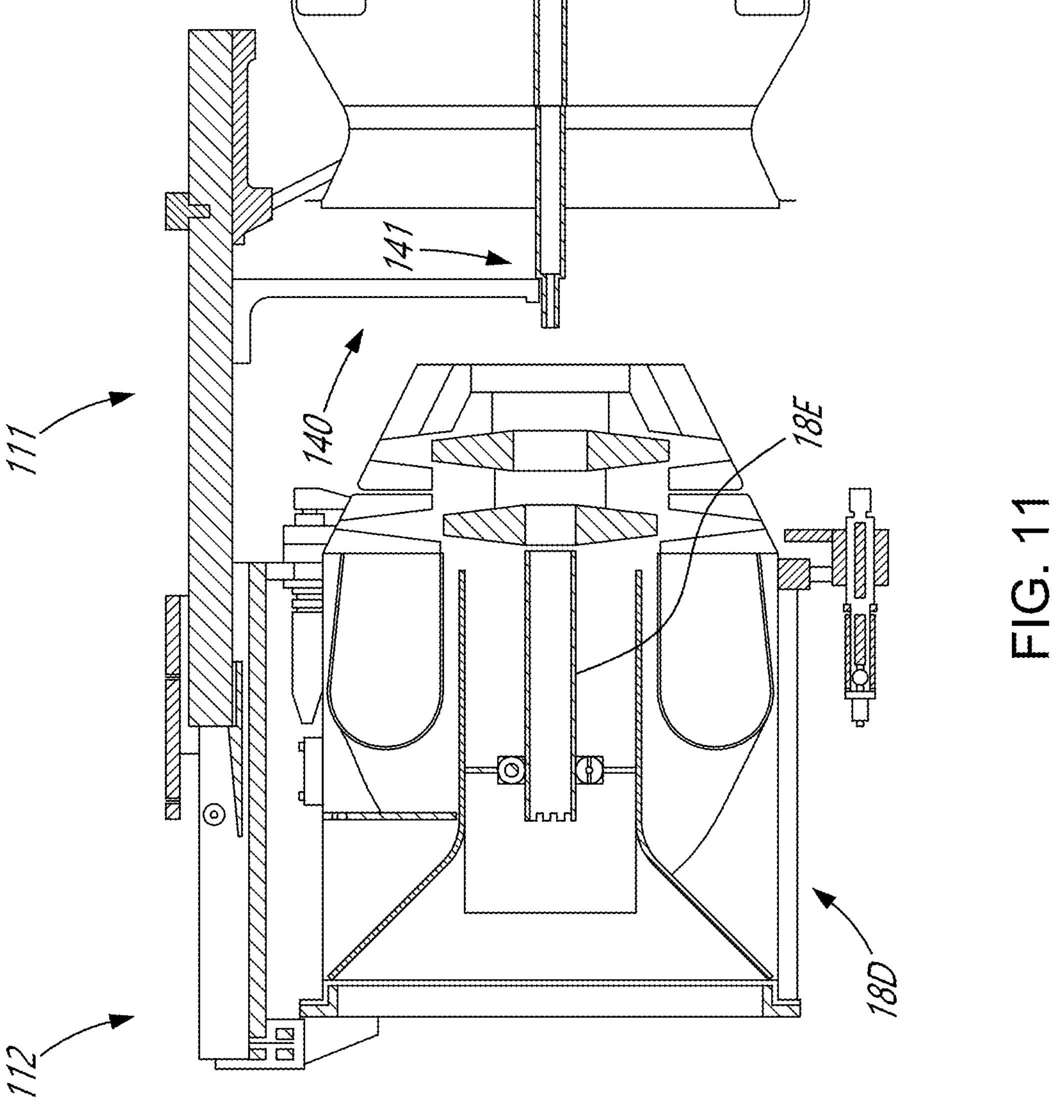
FIG. 11 is a cutaway view illustrating the intermediate shaft support secured to the shaft with the shaft supporting rod being removed for removal of the exhaust case.

As shown in FIG. 11, the removing of the exhaust case 18D at 308 may include: separating the mobile member 112 of the support fixture assembly 110 from the static member 111; and moving the exhaust case 18D away from the turbine case 18C via the mobile member 112. This may be done by hoisting the exhaust case 18D via the mobile member 112 using, for instance, the anchors 115.

Figure 12:
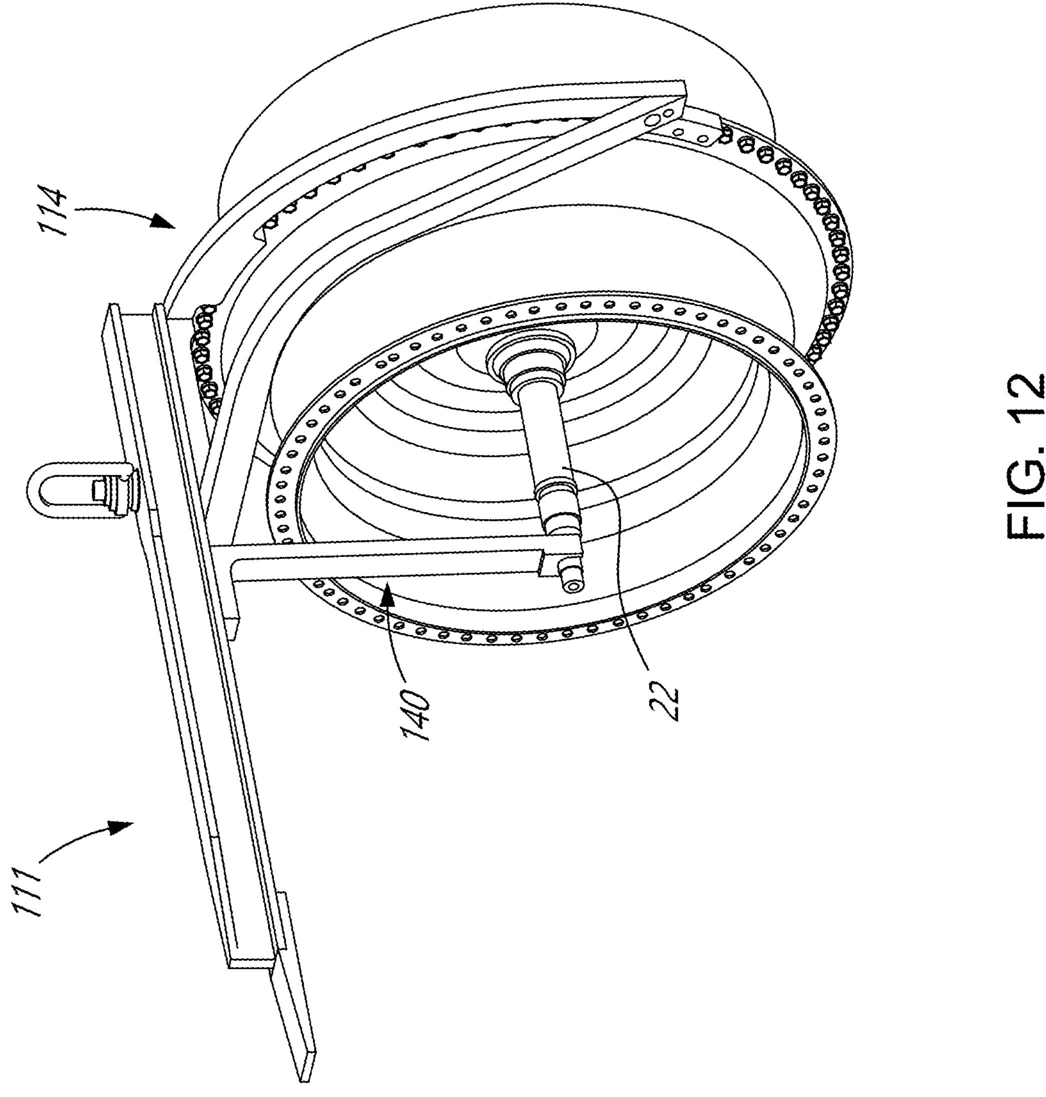
FIG. 12 illustrates a turbine case with a static member of the support fixture assembly secured thereto with the exhaust case removed.
Figure 13:
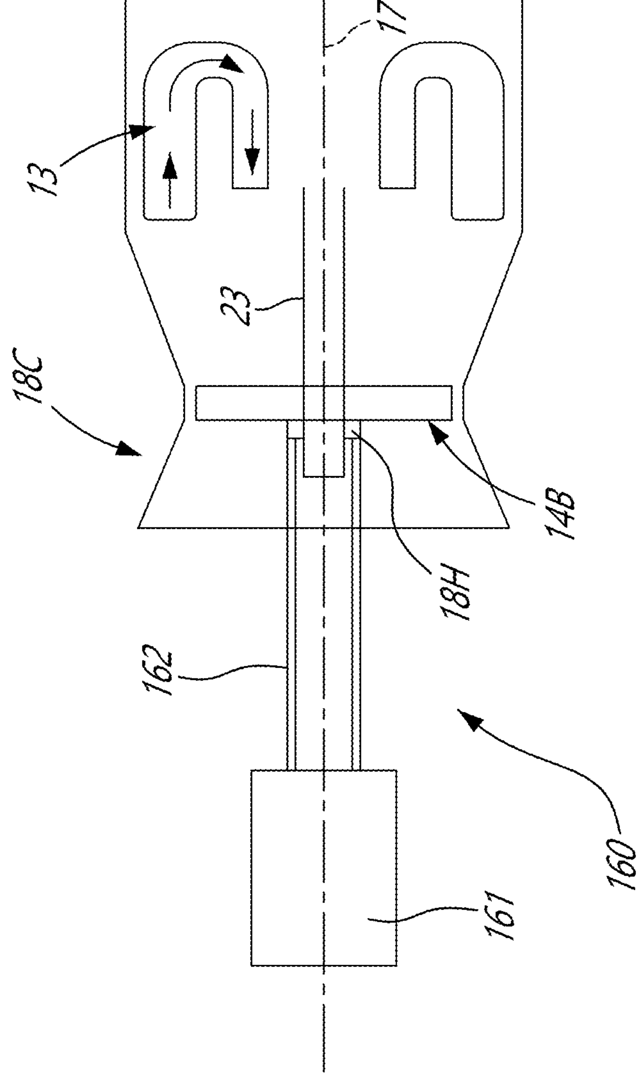
FIG. 13 is a schematic cross-sectional view illustrating the turbine case and a tool for removing a high-pressure turbine of the aircraft engine.

As shown in FIGS. 12-13, the HP turbine 14B is now accessible and the method 300 may include removing the HP turbine 14B being enclosed by the turbine case 18C. As shown in FIG. 13, this may include unfastening a nut 18H threaded on a HP shaft 23. More specifically, a pulling tool 160 may include an actuator 161, such as a hydraulic actuator, engaged to a tool 162, which may engage the nut 18H. The actuator 161 may be used for one or more of unfastening the nut 18H and exerting a pulling force to remove the HP turbine 14B. The actuator 161 may be secured to the static member 111 of the support fixture assembly 110 during the exerting of the pulling force. Understandably, the actuator 161 may be used to reinstall the HP turbine 14B in the turbine case 18C and re-fastening the nut 18H.

Figure 14:
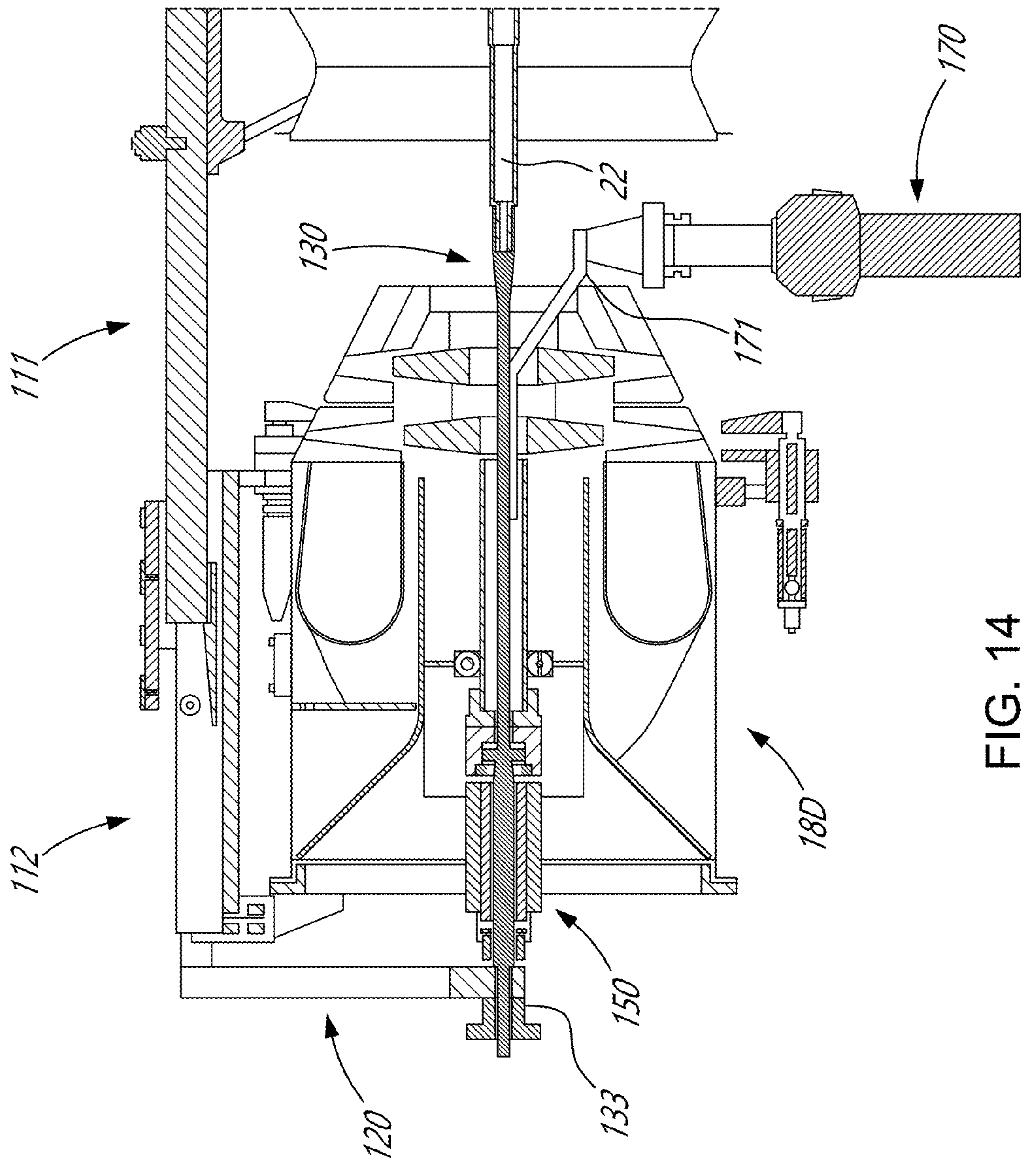
FIG. 14 is a cutaway view illustrating a re-installation process of the exhaust case using the system of FIG. 2A.

As shown in FIG. 14, the exhaust case 18D may be re-installed after the maintenance operations have been performed on the gas turbine engine 10. This may include re-engaging the mobile member 112 to the static member 111. The intermediate support member 140 may be removed from the gap G to disengage the LP shaft 22 from the static member 111 via the gap G. This allows the moving of the exhaust case 18D towards the turbine case 18C. Also, some components may be fitted using a press fit. This may require heating some components to allow their engagement. To so do, a heat gun 170 having a funnel 171 may be used to locally heat the components to expand them to allow their mating.

Figure 15:
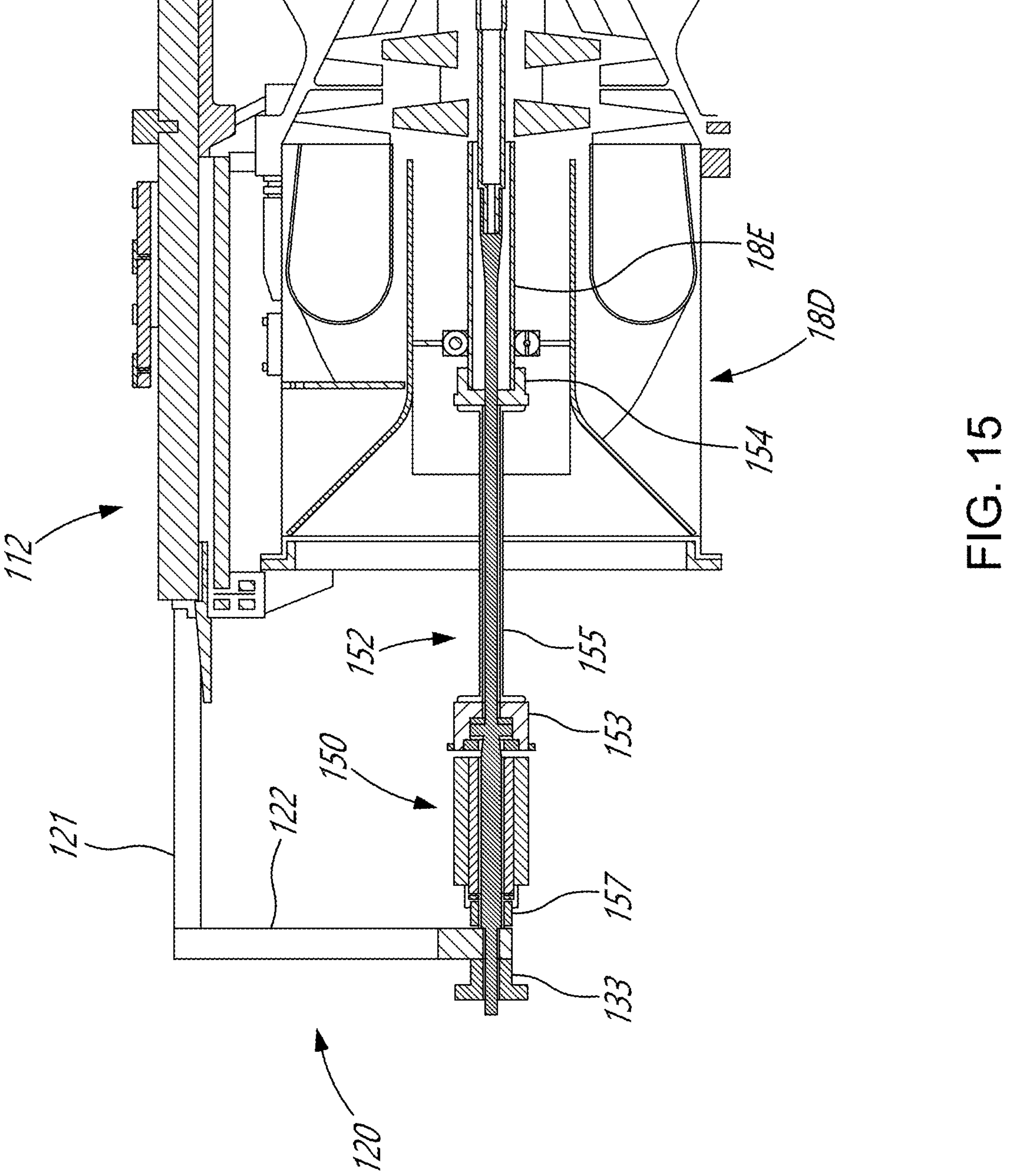
FIG. 15 is another cutaway view illustrating the re-installation process of the exhaust case using the system of FIG. 2A.

As depicted in FIG. 15, once the components are suitably heated, the exhaust case 18D may be slid towards the turbine case 18C and the case pulling mechanism 150 may be used to exert a pushing force on the exhaust case 18D to mate the flanges of these cases together. In this case, the actuator 151 may be locked axially on the shaft supporting rod 130. This may require the use of a locking nut 157; the actuator 151 being disposed between the locking nut 157 and the stopper 134 of the shaft supporting rod 130. The actuator 151 may be powered to exert a pulling force on the shaft supporting rod that is counteracted by a pushing force on the exhaust case 18D. Since the shaft supporting rod 130 is axially locked to the support fixture assembly 110, only the exhaust case 18D is allowed to move towards the turbine case 18C. In some cases, a tool may be used to bring the mating flanges in contact. The different parts of the system 100 may be removed from the gas turbine engine 10.

The disclosed system and method may facilitate servicing or maintenance operations performed on a gas turbine engine since said engine need not be removed from the aircraft. Reduced down times and cost savings may result from the use of the system and method presented in this disclosure.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of servicing an aircraft engine mounted to an aircraft, the aircraft engine having a central axis and a case assembly including a first case secured to a second case and being axially offset from one another, the method comprising:

while the aircraft engine remains mounted to the aircraft:

radially supporting, relative to the central axis, an end of a shaft of the aircraft engine through a central passage extending axially through the first case with a shaft supporting rod;

creating a gap between the first case and the second case by axially moving the first case away from the second case and relative to the shaft while preventing axial and radial movements of the shaft relative to the central axis;

radially and axially supporting the shaft at the gap; and removing the first case by disconnecting the end of the shaft from the shaft supporting rod while maintaining the shaft radially and axially supported at the gap.

2. The method of claim 1, wherein the radially supporting of the end of the shaft includes:

inserting the shaft supporting rod through the central passage defined by the first case; and locking the shaft supporting rod to the shaft.

3. The method of claim 2, comprising detachably mounting the shaft supporting rod to a support fixture assembly mounted to the case assembly of the aircraft engine.

4. The method of claim 3, comprising:

mounting a static member of the support fixture assembly to a case of the case assembly, the case being distinct from the first case;

mounting a mobile member of the support fixture assembly to the first case, the mobile member slidably engaged to the static member of the support fixture assembly.

5. The method of claim 4, wherein the inserting of the shaft supporting rod includes:

securing a brace fixture of the support fixture assembly to the static member of the support case assembly; and securing the shaft supporting rod to the static member of the support case assembly via the brace fixture.

6. The method of claim 4, wherein the creating of the gap includes:

axially locking the shaft supporting rod to the static member of the support fixture assembly;

exerting a pushing force on the shaft supporting rod with an actuator, the pushing force being counteracted by a pulling force exerted on the first case.

7. The method of claim 6, wherein the actuator has an outer member being slidable relative to an inner member, the inner member defining a central bore for slidably receiving the shaft supporting rod, the exerting of the pushing force on the shaft including:

inserting the shaft supporting rod through the central bore of the inner member of the actuator;

axially locking the outer member of the actuator to the first case; and exerting the pushing force on a stopper defined by the shaft supporting rod thereby exerting the pulling force on the first case.

8. The method of claim 7, wherein the axially locking of the outer member of the actuator to the first case includes:

securing the outer member of the actuator to a pad;

securing an adaptor to an inter-shaft of the first case, the inter-shaft rotatably mounted to the first case and drivingly engaged to the shaft; and securing a spacer to both of the pad and the adaptor.

9. The method of claim 4, wherein the axially moving of the first case away from the second case and relative to the shaft includes:

sliding the mobile member and the first case mounted thereto relative to the static member to separate the first case from the second case thereby creating the gap.

10. The method of claim 4, wherein the radially and axially supporting of the shaft through the gap includes:

mounting an intermediate shaft support to the static member of the support fixture assembly; and connecting the intermediate shaft support to the shaft.

11. The method of claim 10, wherein the removing of the first case includes:

separating the mobile member of the support fixture assembly from the static member; and moving the first case away from the second case via the mobile member.

12. The method of claim 11, wherein the moving of the first case includes hoisting the first case via the mobile member.

13. The method of claim 4, wherein the mounting of the static member of the support fixture assembly to the second case includes mounting the static member of the support fixture assembly to a flange of the second case.

14. The method of claim 13, wherein the static member of the support fixture assembly has a top beam and a brace secured to the top beam, the brace defining a U-shape and extending partially around the case assembly, the method including:

securing the brace to the flange of the second case.

15. The method of claim 14, wherein the mobile member of the support fixture assembly has a top rail, the method including:

slidably engaging the top rail of the mobile member to the top beam of the static member.

16. The method of claim 15, wherein the mobile member includes a forward brace and a rearward brace both secured to the top rail, the method including:

securing each of opposite flanges of the first case to a respective one of the forward brace and the rearward brace.

17. The method of claim 4, comprising after servicing of the aircraft engine re-installing the first case by:

slidably engaging the mobile member to the static member;

radially and axially supporting the end of the shaft with the static member;

disengaging the shaft from the static member via the gap; and moving the first case towards the second case.

18. The method of claim 1, further comprising, after the removing of the first case, removing a high-pressure turbine being enclosed by the second case.

19. The method of claim 18, wherein the removing of the high-pressure turbine includes:

unfastening a nut threadingly engaged to a high-pressure shaft of the aircraft engine; and pulling on the high-pressure turbine.

20. The method of claim 19, wherein the pulling on the high-pressure turbine includes pulling on the high-pressure turbine with an actuator.

* * * * *